US008019336B2

(12) United States Patent  (10) Patent No.: US 8,019,336 B2
Jones et al.  (45) Date of Patent: Sep. 13, 2011

(54) SLICE BASED ARCHITECTURE FOR A MULTIFUNCTION RADIO

(75) Inventors: Gregory O. Jones, San Diego, CA (US); Michael E. Campbell, San Diego, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 412 days.

(21) Appl. No.: 11/296,463

(22) Filed: Dec. 8, 2005

(65) Prior Publication Data

US 2006/0141954 A1 Jun. 29, 2006

Related U.S. Application Data

(63) Continuation of application No. 10/606,107, filed on Jun. 25, 2003, now Pat. No. 7,016,674, which is a continuation of application No. 09/651,757, filed on Aug. 30, 2000, now abandoned.

(51) Int. Cl.
*H03D 7/16* (2006.01)

(52) U.S. Cl. ............... 455/431; 455/66.1; 455/67.11; 455/74; 455/78; 455/83; 455/98; 455/103; 455/418; 455/423; 455/344; 455/553.1

(58) Field of Classification Search .................. None
See application file for complete search history.

(56) References Cited

U.S. PATENT DOCUMENTS

| | | | |
|---|---|---|---|
| 5,212,804 A | 5/1993 | Choate | 455/431 |
| 5,798,726 A | 8/1998 | Schuchman et al. | 342/37 |
| 5,898,683 A | 4/1999 | Matsumoto et al. | 455/423 |
| 5,953,668 A | 9/1999 | Reilly | 370/331 |
| 6,041,035 A * | 3/2000 | Thedens | 370/217 |
| 6,052,604 A | 4/2000 | Bishop, Jr. et al. | 455/431 |
| 6,072,994 A | 6/2000 | Phillips et al. | |
| 6,091,765 A | 7/2000 | Pietzold, III et al. | |
| 6,353,846 B1 | 3/2002 | Fleeson | 718/104 |
| 6,944,475 B1 | 9/2005 | Campbell | |
| 7,136,643 B2 | 11/2006 | Campbell | |
| 7,430,415 B2 * | 9/2008 | Campbell | 455/431 |
| 2003/0194996 A1 | 10/2003 | Campbell | 455/431 |

(Continued)

FOREIGN PATENT DOCUMENTS

DE 44 23 582 A1 1/1995

(Continued)

OTHER PUBLICATIONS

Office Action dated Jan. 8, 2008 in related U.S. Appl. No. 11/411,907.

(Continued)

*Primary Examiner* — Charles Appiah
*Assistant Examiner* — Willie J Daniel, Jr.
(74) *Attorney, Agent, or Firm* — Posz Law Group, PLC

(57) ABSTRACT

An electronic radio system multifunction slice (100) for a electronic radio system (400). The slice (100) includes an antenna interface (102), several multi-band transceivers (106-112), a processor (104), and an avionics interface (114). The antenna interface (102) couples to the antenna preconditioners of the aircraft. The processor (104) is coupled to the multi-band transceivers (106-112) and antenna interface (102), and controls the transceivers (106-112) and antenna interface (102) to provide signal and data processing for at least two independent radio function threads. The processor (104) is also coupled to the avionics interface (114), which connects to the avionics network of the aircraft. Each multifunction slice 100 provides a programmable multifunction radio.

16 Claims, 8 Drawing Sheets

U.S. PATENT DOCUMENTS

2004/0087283 A1   5/2004   Jones et al. .................. 455/132

FOREIGN PATENT DOCUMENTS

| DE | 198 41 758 A1 | 12/1999 |
|---|---|---|
| EP | 0 439 926 A2 | 8/1991 |
| EP | 0 771 127 A2 | 5/1997 |
| EP | 1 187 356 B1 | 6/2006 |
| EP | 1 696 582 A1 | 8/2006 |
| WO | WO 95/33350 | 12/1995 |
| WO | WO 97/08839 | 3/1997 |

OTHER PUBLICATIONS

European Search Report issued from the European Patent Office on Feb. 6, 2006 in the related European patent application No. 05019019.8-2411.

European Office Action issued from the European Patent Office on Feb. 18, 2008 in the related European patent application No. 05019019.8-2411.

European Search Report issued from the European Patent Office on Jul. 13, 2006 in the related European patent application No. 06012676.0.

European Office Action issued from the European Patent Office on Mar. 6, 2007 in the related European patent application No. 06012676.0.

European Office Action issued from the European Patent Office on Feb. 8, 2008 in the related European patent application No. 06012676.0.

Ray Brousseau et al., *An Open System Architecture for Integrated RF Systems*, pp. 5.1-1-5.1-6, 1997, IEEE.

Barry A. Rich, *Affordable Integrated Sensor Systems*, pp. 257-272, 1996, IEEE.

Brousseau et al., "An Open System Architecture for Integrated RF Systems", Digital Avianoics Systems Conference, 1997, 16$^{th}$ DASC, AIAA/IEEE, Oct. 30, 1997, vol. 1, pp. 4.1-1-5.

Rich, "Affordable Integrated Sensor System", Digital Avionics Systems Conference, 1996, 15$^{th}$ AIAA/IEEE, Oct. 31, 1996, pp. 267-272.

Eyrmann, et al., "Joint Tactical Radio Systems—A Solution to Avionics Modernization", Proc. of the 1999 IEEE Digital Avionics Systems Conf. Oct. 1999, pp. 9.A.5-1-9.A.5-8.

Harris, "Modular Avionics: Its Impacts on Communication, Navigation, and Identification (CNI)", Proceedings of the IEEE National Aerospace and Electronic Conference, NAECON '88, vol. 3, pp. 1164-1169, May 23-27, 1988.

Bryson, "Integrated CNI Terminal Software Architecture", Proceedings of the IEEE National Aerospace and Electronic Conference, NAECON '89, vol. 4, pp. 1713-1721, May 22-26, 1989.

Wolfe et al., "Integrated CNI Avionics Using F-22 Modular Products", Proceedings of the IEEE National Aerospace and Electronic Conference, NAECON '96, vol. 1, pp. 264-271, May 20-23, 1996.

European Office Action issued from the European Patent Office on Oct. 11, 2010 in the related European patent application No. 05 019 019.8-2411.

European Search Report issued from the European Patent Office on Mar. 1, 2011 in the related European patent application No. 10008894.7-2411.

\* cited by examiner

SLICE BASED ARCHITECTURE FOR A MULTIFUNCTION RADIO

CROSS REFERENCE TO RELATED APPLICATIONS

This application is a continuation of application Ser. No. 10/606,107, filed Jun. 25, 2003 and allowed on Nov. 3, 2005, which is a continuation of application Ser. No. 09/651,757, filed Aug. 30, 2000. This application is also related to application Ser. No. 10/446,344, filed May 28, 2003 now U.S. Pat. No. 7,136,643 and allowed on Dec. 2, 2005, which is a continuation of application Ser. No. 09/651,752, filed Aug. 30, 2000 now abadoned, and to application Ser. No. 09/651,754, filed Aug. 30, 2000, which issued on Sep. 13, 2005 as U.S. Pat. No. 6,944,475.

BACKGROUND OF THE INVENTION

The present invention relates to avionics and electronic radio systems. In particular, the present invention relates to a slice based architecture for building an electronic radio system.

Military aircraft require an electronic radio or CNI avionics system capable of implementing three important classes of functions: communications, navigation and identification (CNI). Communications functions include, for example, communicating over a voice radio and interfacing into a data network; navigation functions include, for example, receiving input radio beacons, glide slope indicators and the global positioning system (GPS); identification functions include, for example, friend-or-foe interrogation. In the case of civilian aircraft, where identification functions are not required, surveillance functions are typically substituted. Surveillance functions include, for example, identification, and position and flight path determination of other aircraft. Communication functions, navigation functions, identification functions, and surveillance functions are generally referred below as the radio functions of an electronic radio system.

In the past, a predetermined set of independent resource assets implemented a typical radio function. Resource assets include, for example, antennas, antenna preconditioning units, transceivers (or transmitters and receivers), modems (or modulators and demodulators), digital signal processors, amplifiers, microphones, headsets, and the like. Thus, a voice channel reception radio function might be implemented using an antenna, an antenna preconditioning unit, an amplifier, a receiver, a demodulator, a digital to analog converter, an amplifier, and a headset. The resource assets were dedicated to the particular radio function that the resource assets were designed to perform.

In other words, prior electronic radio systems were developed using point design architectures that were unique to the radio functionality being provided. Each radio function required a separate dedicated architecture that lead to a fixed design that was difficult to modify, for example, for performance upgrades and technology enhancements. As the total number of radio functions increased that the aircraft was required to perform, so did the complexity and the size, weight, and power requirements of the electronic radio system as a whole. However, the need to limit the size, weight, and power requirements in an aircraft is paramount.

Aircraft, and in particular military aircraft, commonly have their flight plans broken up into units referred to as mission segments. Commonly, during any given mission segment, the aircraft exercises only a predetermined subset of the radio functions that the aircraft supports. As examples, missions segments may include "Departure and Recovery", during which a first subset of radio functions operate, "Air-to-Air Combat and Ground Attack", during which a second subset or radio functions operate, and "Safe Return to Base", during which a third subset or radio functions operate. Although the aircraft uses only a subset of all its radio functions during a mission segment, past electronic radio system designs often required the aircraft to carry all of the resource assets necessary to provide the full set of radio functions at all times.

The path that radio function data takes through the resources assets that support that radio function is referred to as a function thread. For example, a VHF voice reception radio function thread may start at a VHF antenna, continue through a VHF antenna interface unit, a VHF receiver, signal processor, an audio control panel, and finally a headset. One disadvantageous aspect of prior design techniques was that radio function threads were formed using independent sets of resource assets. In other words, resource assets were not shared based upon the radio function requirements for the current mission segment, thereby leading to the over-inclusion of resource assets to realize the electronic radio system.

In an effort to limit the size, weight, and cost of a electronic radio system, a building block approach was developed. Each building block was capable of performing a portion of the processing required by several different radio functions. However, many different types of building blocks existed. Thus, while an electronic radio system built using the wide variety of building blocks was able to share common installation, packaging and infrastructure resources, the resulting integrated control and data routing created complex interdependencies between radio functions. The interdependencies further complicated the development cycle, and increased the potential for unexpected impact on existing radio functions as a result of repair, replacement, or upgrade of another radio function.

A need has long existed in the industry for a multifunction radio for use in an electronic radio system that addresses the problems noted above and others previously experienced.

BRIEF SUMMARY OF THE INVENTION

A preferred embodiment of the present invention provides an electronic radio system multifunction slice. The slice includes an antenna receive/transmit interface, several multi-band transceivers, a processor, and a avionics interface. The antenna interface couples to the antenna preconditioners of the aircraft.

The processor is coupled to the multi-band transceivers and controls the transceivers to provide at least two independent CNI function threads. The processor is also coupled to the avionics interface. The processor may also provide digital signal processing functions for the RF signals such as modulation or decryption. The avionics interface connects to the overall avionics architecture of the aircraft. The avionics interface provides for input and output of signals to and from the electronic radio system multifunction slice from and to the rest of the aircraft.

The invention also provides a multifunction electronic radio system comprising several electronic radio system multifunction slices, several antennas, several antenna preconditioners, and a backplane. The electronic radio system multifunction slices may be interconnected by means of the network bus connectors of each electronic radio system multifunction slices. Each of the antenna preconditioners is coupled to one or more of the electronic radio system multifunction slices. The electronic radio system multifunction slices may also couple to the avionics bus of the electronic radio system.

The invention further provides a method of implementing a multifunction electronic radio system. The first step of the method is to determine a set of CNI functions to be performed by a multifunction Electronic radio system. Then, all of the CNI functions are assigned across several electronic radio system multifunction slices. Following this assignment, the antenna receive/transmit interfaces of the electronic radio system multifunction slices are interconnected to the antenna preconditioners of the aircraft. Finally, the avionics interfaces of the electronic radio system multifunction slices are coupled to the avionics bus of the aircraft.

DETAILED DESCRIPTION OF THE INVENTION

Figure 1:
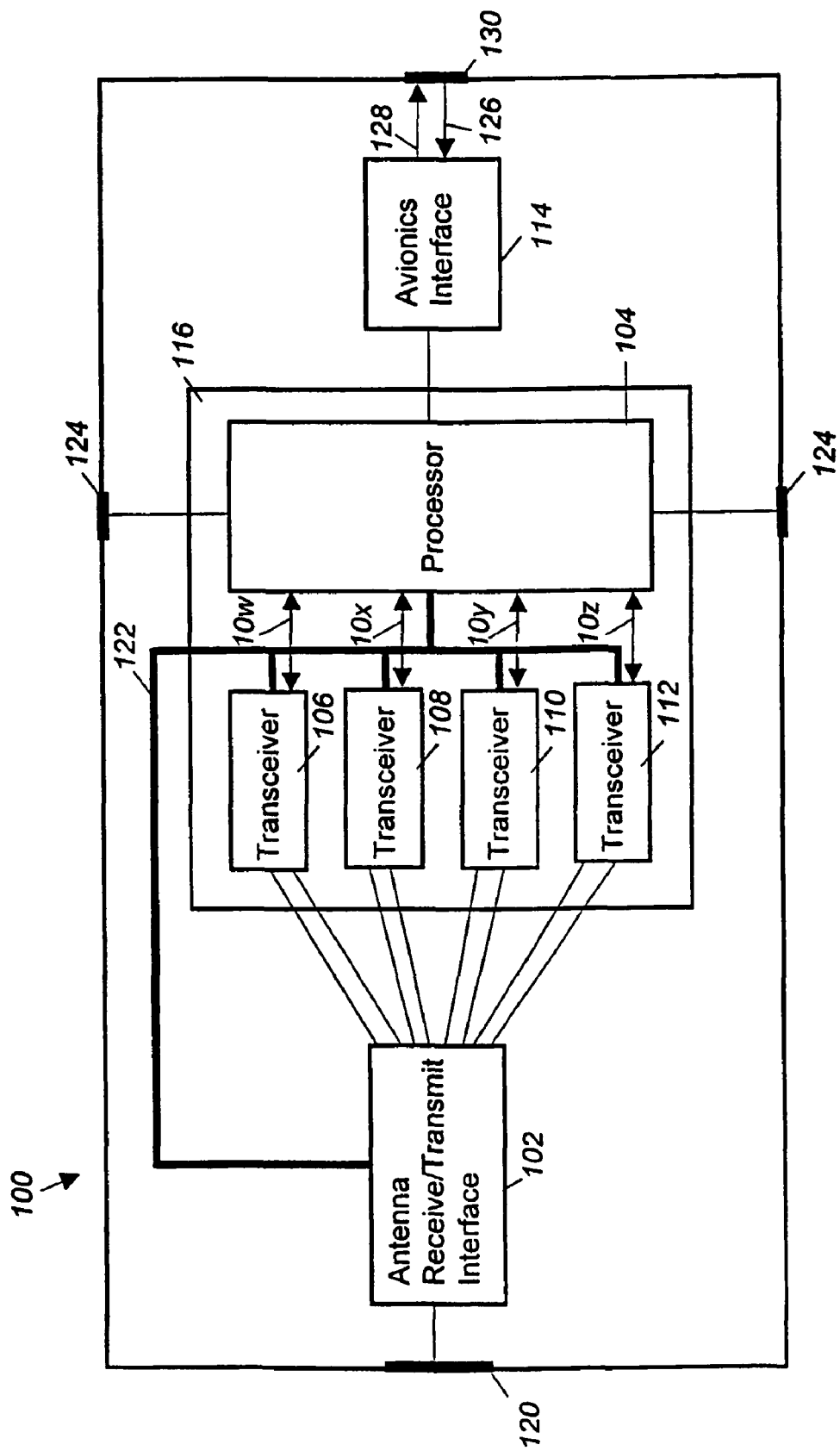
FIG. 1 illustrates an electronic radio system multifunction slice.

Turning now to FIG. 1, that figure illustrates an electronic radio system multifunction slice 100 for an electronic radio system. The multifunction slice 100 includes an antenna interface 102, a processor 104, multi-band transceivers 106, 108, 110 and 112, and a avionics interface 114. The processor 104 and the transceivers 106, 108, 110 and 112 are shown grouped together as a transceiver-processor building block 116. The transceiver-processor building block 116 is discussed in detail below with reference to FIGS. 7 and 8. Each multifunction slice is a programmable multifunction radio identical in construction to every other multifunction slice, and, as will be described below, may be coupled together to create more complex electronic radio systems. Note that while the multifunction slice 100 is shown as having four transceivers 106, 108, 110 and 112, a multifunction slice may have greater or fewer transceivers, according to the particular application, and optimization of resource assets as described below.

The transceivers 106, 108, 110 and 112 provide low level transmit and receive functionality in the frequency spectrum assigned to the radio functions for which the multifunction slice 100 is responsible. The transceivers 106, 108, 110, and 112 are preferably tunable over a very wide range of frequencies (e.g., from VHF band to L band) in order to support a wide range of radio function frequencies. As a result, fewer transceivers are generally needed in each multifunction slice, thereby facilitating the size, weight, and cost benefits of the slice based architecture described in more detail below.

The antenna interface 102 of the slice couples one or more antenna preconditioners to the transceivers 106, 108, 110 and 112 via the antenna interface 102 switch matrix, and provides RF amplification for transmit functions. The antenna interface 102 is accessible external to the slice through the antenna connector 120. The antenna interface 102 contains switching subassemblies, preamplification to establish system NF (in some cases) and multiband RF transmit amplification. The processor 104 controls the mapping of particular antenna preconditioners to particular transceivers. This control is provided in the form of RF control signals sent from the processor 104 to the antenna interface 102 over the local RF control bus 122. The processor 104 is connected to transceivers 106, 108, 110, 112 via bi-directional data interfaces (analog or digital) 10$w$, 10$x$, 10$y$, 10$z$.

The processor 104 is accessible external to the multifunction slice 100 at one or more network bus connectors 124. The multifunction slice 100 may be interconnected to one or more other multifunction slices through the network bus connectors 124. The local RF control bus 122 also connects the processor 104 to each of the transceivers 106, 108, 110 and 112 to provide tuning and other settings control. The processor 104 and its interconnection with other components of the electronic radio system multifunction slice 100 is discussed in detail with respect to FIGS. 7 and 8 below.

The avionics interface 114 couples the core avionics of the aircraft to the processor 104. The avionics interface provides a avionics input 126 and a avionics output 128. The avionics input 126 and output 128 are accessible at the avionics connector 130 of the electronic radio system multifunction slice 100. The avionics input 126 may be used, for example, to accept unencrypted classified data from other aircraft subsystems that are to be encrypted and then transmitted. The avionics output 128 may provide, for example, data signals that have been received and decrypted, then provided to the aircraft user.

Figure 2:
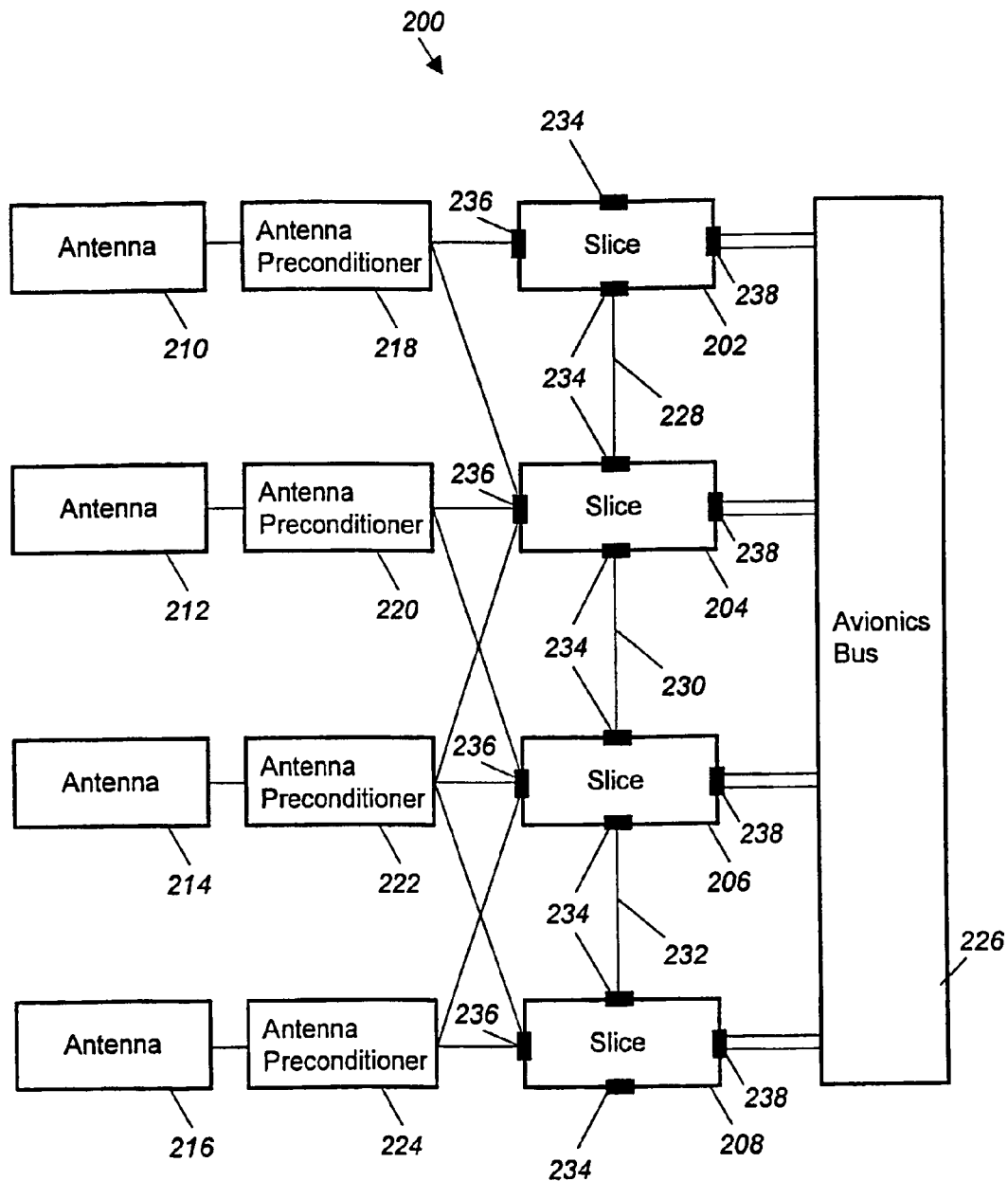
FIG. 2 illustrates a multifunction electronic radio system implemented using multifunction slices.

With reference now to FIG. 2, that figure illustrates a multifunction electronic radio system 200 composed of four multifunction slices 202, 204, 206 and 208. Also shown in FIG. 2 are antenna apertures 210, 212, 214, and 216, antenna preconditioners 218, 220, 222, and 224, and the avionics network bus 226.

The multifunction slices 202, 204, 206, and 208 are interconnected in accordance with the requirements of the particular bus architecture used to implement the network bus interface of each multifunction slice 202, 204, 206, and 208. For example, the multifunction slices 202, 204, 206 and 208, may be coupled together using IEEE-1394 serial connections 228, 230, and 232 between the network bus connectors 234.

The multifunction slices 202, 204, 206, and 208 are coupled to the antenna preconditioners of the aircraft at the antenna connectors 236 of the electronic radio system multifunction slices 202, 204, 206 and 208. It is not necessary that each multifunction slice 202, 204, 206, and 208 be connected to each of the antenna preconditioners. However, connecting a particular multifunction slice to a particular antenna preconditioner allows that multifunction slice to run function threads through the preconditioner and associated antenna. Note that some antenna preconditioners may simply be a cable.

The multifunction slices 202, 204, 206, and 208 are also coupled to the avionics network bus 226 of the aircraft at the avionics connectors 238 of the electronic radio system multifunction slices 202, 204, 206, and 208. The avionics network bus 226 of the aircraft provides input to the multifunction slice from the rest of the aircraft. The avionics network bus 226 also receives the output of the electronic radio system multifunction slices 202, 204, 206, and 208. The avionics network bus 226 thereby serves as a general input/output structure that delivers information to be transmitted to the electronic radio system 200 and that delivers information received by the electronic radio system 200 to, as examples, headsets or aircraft computers.

Figure 3:
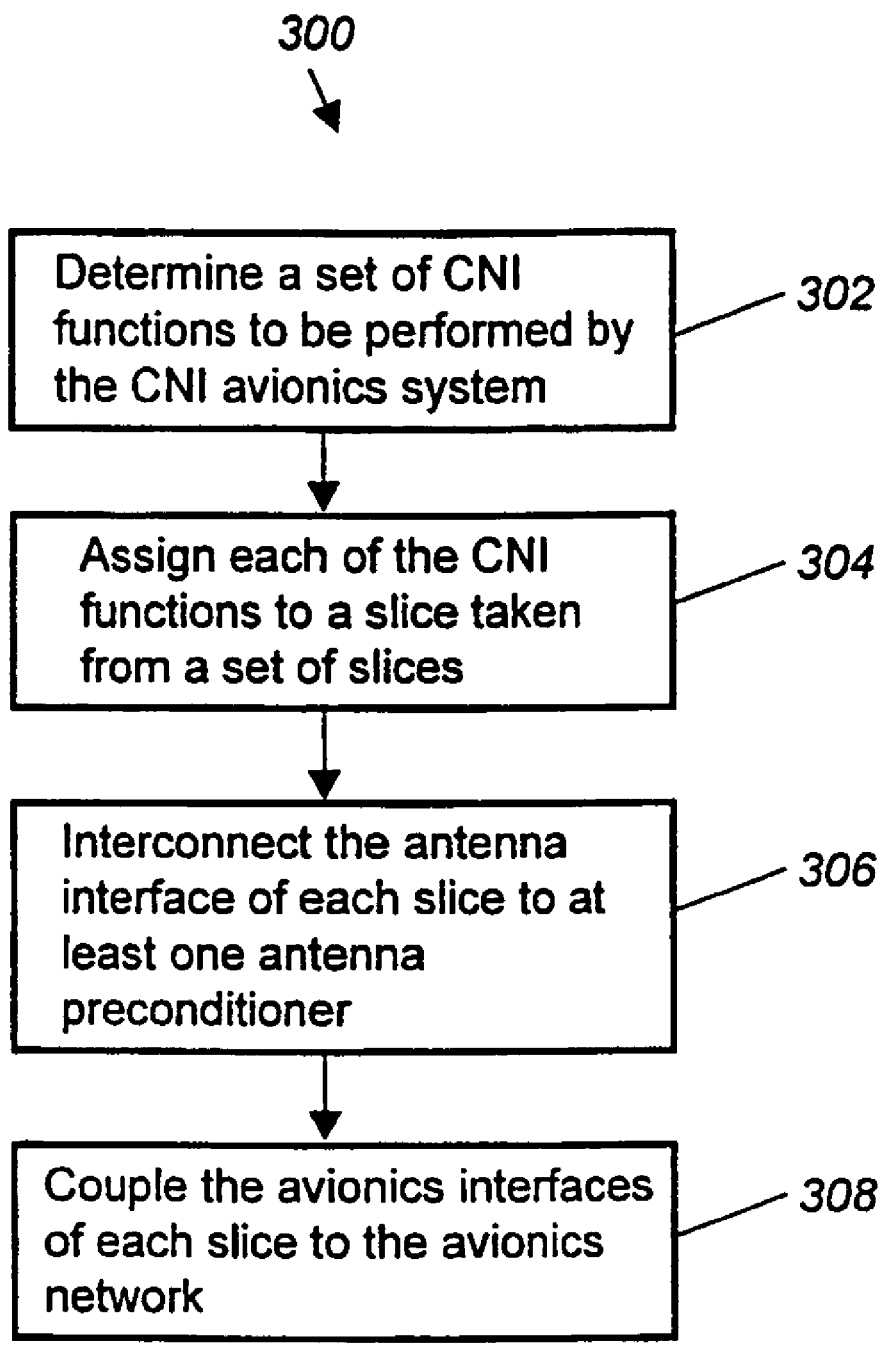
FIG. 3 shows a method for implementing a multifunction electronic radio system using multifunction slices.

Turning next to FIG. 3, that figure shows a flowchart 300 of a method of implementing a multifunction electronic radio system, in this case, a Communication Navigation Identification (CNI) system. At step 302, the set of radio functions to be implemented by the electronic radio system is determined. The total number of simultaneous radio functions required and the number of radio functions that each multifunction slice can implement will determine a minimum number of slices needed. The transceivers used in each identical multifunction, slice are of course selected to support the frequency bands used by the radio function threads. By implementing a transceiver operable over as wide frequency range as possible, fewer transceiver types are generally needed in each multifunction slice (optionally, only one.

At step 304, each of the radio functions identified in step 302 is assigned to a particular multifunction slice. At step 306, each multifunction slice is connected to each of the antenna preconditioning units associated with a radio function supported by that multifunction slice. If, for example, multiple radio functions supported by a multifunction slice share a common preconditioner, then only a single connection is preferably made to that preconditioner. At step 308, each multifunction slice is connected to the avionics network of the aircraft.

Once the multifunction slices are selected and interconnected, the processor in the multifunction slices is primarily responsible for transmission and reception of voice and data over each function thread. As will be discussed in more detail below, an assigned master processor embedded in one of the slices may exercise coordination over each and all multifunction slices to program and reprogram the assignment of function threads to resource assets.

Figure 4:
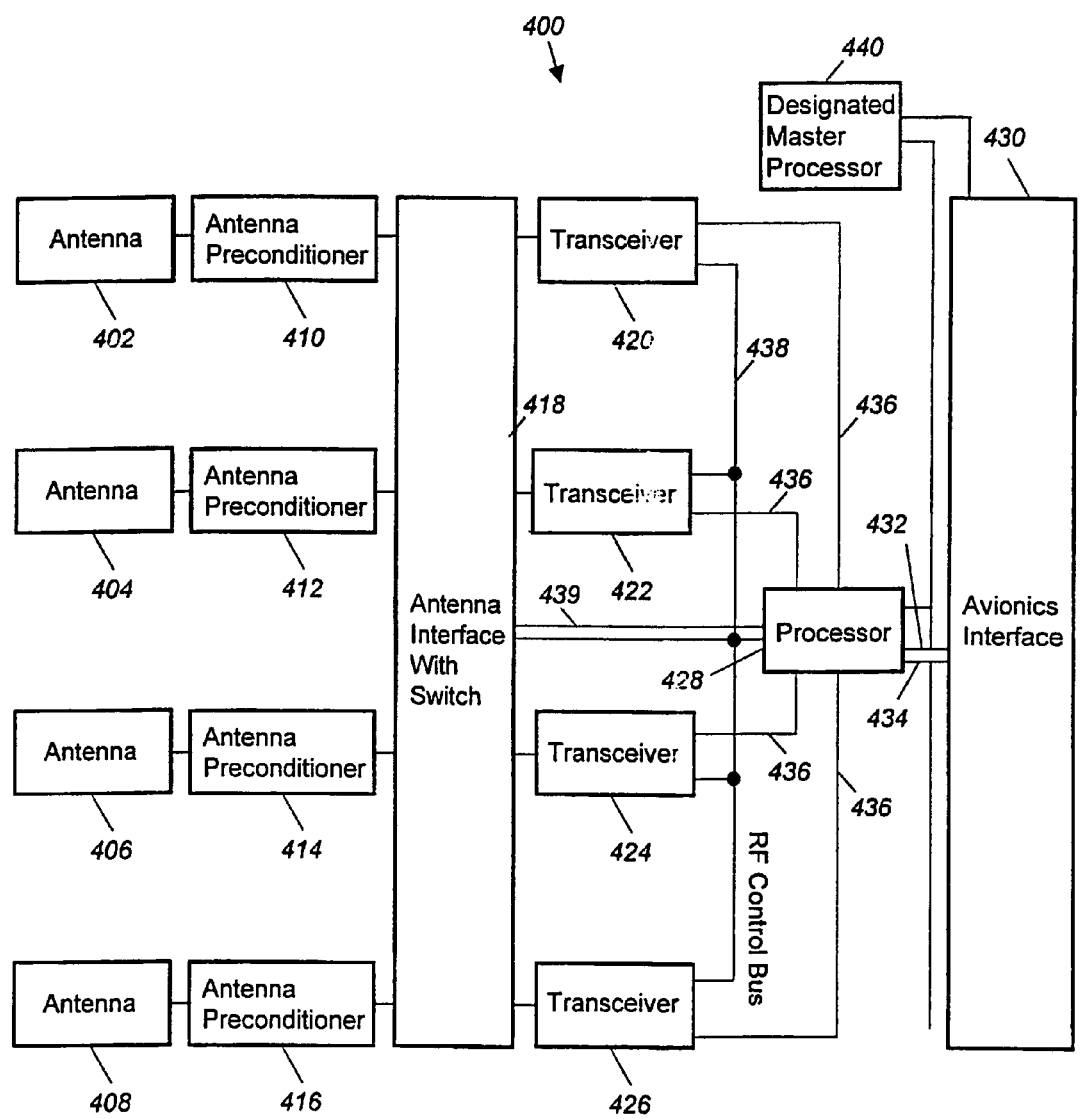
FIG. 4 illustrates an electronic radio system with reprogrammable resource assets.

Turning next to FIG. 4, that figure illustrates single slice electronic radio system 400 that is capable of reprogramming resource assets in real time. The electronic radio system 400 comprises antennas 402, 404, 406 and 408, antenna preconditioners 410, 412, 414, and 416, antenna interface 418, transceivers 420, 422, 424 and 426, processor 428, and avionics interface 430.

The antennas 402, 404, 406 and 408 support reception and transmission of signals at the frequencies assigned to the radio functions performed by the electronic radio system 400. While the electronic radio system 400 is shown in FIG. 4 as having four antennas, an electronic radio system may have more or fewer antennas depending on the particular function thread requirements of the electronic radio system 400. Each of the antennas 402, 404, 406, and 408 is coupled, respectively, to an antenna preconditioner 410, 412, 414 and 416.

The antenna preconditioners 410, 412, 414 and 416 are coupled to the antenna interface 418. The antenna interface 418 contains, for example, multiple 1-by-4 or 4-by-1 switches. The antenna interface switch 418 may Map on a one-to-one basis, or it may be capable of operating in a multicast mode. Each of the transceivers 420, 422, 424 and 426, is also connected to the antenna interface switch 418. Voice and data from each of the transceivers 420, 422, 424 and 426, is communicated to the avionics interface 430 through the processor 428 via the input connection 432 and the output connection 434 (which may be associated with a network bus connection described in FIG. 7). Note that the avionics interface switch 418 need not be a total N×N switch, but more likely a N×M switch where M<N, and that additional switches may be provided between any of the resource assets. The processor 428 is preferably coupled to each switch provided, however, in order to support programmable function threads as described below.

The processor 428 is connected to each of the transceivers. 420, 424, 426 and 428 by a baseband interface 436. The processor 428 controls the transceivers 420, 422, 424 and 426 by sending RF control signals over the RF control bus 438, for example, to command the transceiver to tune to a particular frequency and receive data. The processor 428 controls static settings in the antenna interface 418 by sending control signals over the RF control bus 438. The processor 428 is also connected to the switch 418 (and any other switches provided) by means of switch control line 439 for very low latency control requirements. The processor 428 may then send appropriate switching control signals over the switch control line 439 to control the input/output behavior of the antenna interface switch 418.

During a particular mission segment, the processor 428 will generate RF control signals and switching control signals to create radio function threads that realize the radio functions required during that mission segment. For example, during a departure and recovery mission segment, the processor 428 generates RF control signals and switching control signals to create radio function threads to realize departure and recovery radio functions. Departure and recovery CNI functions may include, for example, voice communications, glide-slope indication and radio beacon acquisition.

In this respect, the processor 428 acts as a switching control unit to provide signal interconnection between resource assets to implement complete function threads. Thus, for example, in a voice transmission radio function, the processor 428 implements a path from the avionics interface, through the processor (where encoding baseband modulation and encryption may occur), through a transceiver (where frequency selective upconversion, IF modulation, filtering, and IF amplification gain characterization may occur), through the antenna interface 418 (where RF power amplification and antenna switch selection occur), to a preconditioner, and finally to an antenna for radiation into space.

When the aircraft changes mission segments, for example, to an air-to-air combat and ground attack mission segment, the processor 428 generates the RF control signals and switching control signals that create radio function threads that realize air-to-air combat and ground attack radio functions. Air-to-air combat and ground attack radio functions may include, for example, encrypted voice and data communications over ECCM links, reception on channels over which special orders are transmitted, C-cell, narrow-band (NB) data reception and transmission (from/to a satellite, for example), Integrated Broadcast Services (IBS), Identification Interrogation, Identification Transponder, Radar Altimeter, Joint Tactical Combat Training System (JTCTS) and Global Positioning System threads (GPS). The CNS FANS/GATM suite of functions for commercial aviation could be implemented in like manner.

The processor 428 preferably generates RF control signals and switching control signals to implement only the radio function threads required in each mission segment. As a result, the electronic radio system need include only the resource assets required to support the maximum simultaneous number of radio function threads across the mission segments. For example, assume that Table 1 represents the resource assets required in each of three mission segments A, B and C. Table 2 then shows the resource assets needed to implement the electronic radio system under prior independent resource asset design paradigms and the present reprogramable resource asset paradigm.

TABLE 1

| Mission Segment | Resource Assets Required |
| --- | --- |
| A | Q, R, S |
| B | R, S, T |
| C | R, R, S |

TABLE 2

| Design Used | Assets Required |
| --- | --- |
| Independent | Q, R, R, R, S, S, S, T |
| Reprogrammable | Q, R, R, S, T |

As Table 2 shows, a substantial savings in the total number of resource assets required results through reassigning the function threads to the Q, R, R, S, and T resource assets as governed by the current mission segment. In an electronic radio system designed using independent resource assets for each function thread, a total of nine resource assets are required. However, in the present real-time reprogramable electronic radio system, only five asset resources are required. A substantial decrease in the total number of resource assets leads to a direct decrease in the size, weight, and power requirements of the electronic radio system.

In operation, the processor 428 receives a radio function set selection signal over the network bus, via the avionics interface 436 for example. The radio function set selection signal indicates to the processor 428 which radio function threads are presently required. The processor 428 may receive the radio function set selection signal from the processor which has been designated the master processor 440 that tracks the current mission segment of the aircraft. For a single slice application, processor 428 will also be designated the master processor 440. For multiple slice applications, only one slice processor 428 will be designated the master 440 with backup provided by another slice processor 428 in the event of master failure. That is, in the event of a failure of the master processor 440, a second processor 428 will take over as the designated master processor 440. Alternatively, the radio function set selection signal may be received over the avionics network in response to a direct pilot override or selection switch.

Re-programmability of resource assets also leads to increased fault tolerance for critical radio functions. A resource asset that fails may be circumvented by the processor 428 through RF and switching control signals that implement an alternate radio function thread that avoids the failed resource asset. This may occur within a slice, or across multiple slices. Depending on the total number of radio functions that may be implemented and the number of radio functions used in the current mission segment, re-threading a critical radio function may cause a non-critical (or lower priority critical) radio function to become unavailable. Priorities among the various radio functions of each mission segment may be pre-programmed in the designated master processor 440 before a mission, with radio functions re-threaded according to their priorities. Alternatively, the pilot may also assign or override priorities for the radio functions in real time using a radio function demand switch command message assigned to any desired radio function.

Figure 5:
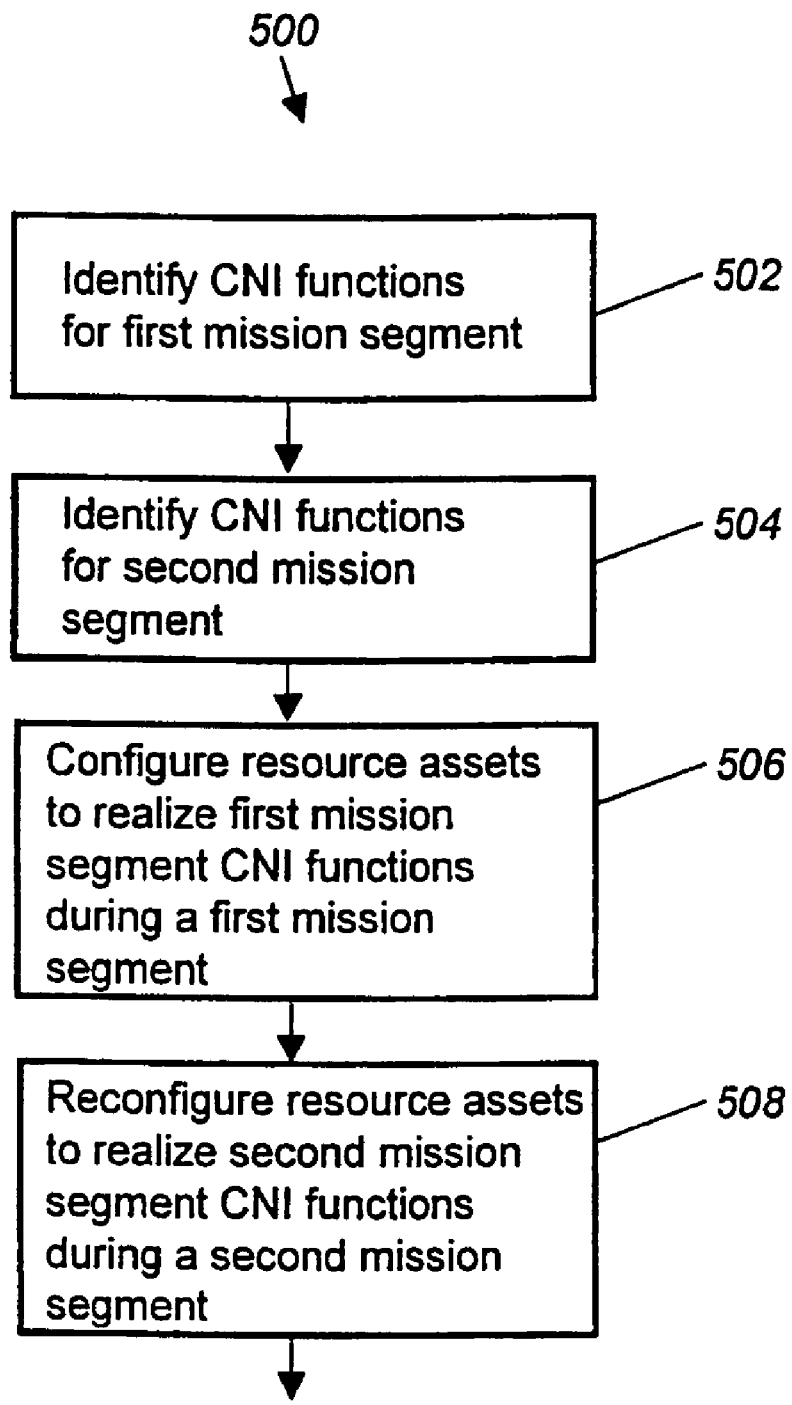
FIG. 5 shows a method for controlling a set of resource assets in an electronic radio system.

Turning now to FIG. 5, that figure shows a flowchart 500 of a method for controlling a set of resource assets in an electronic radio system. At step 502, the radio functions required during a first mission segment for the aircraft are determined. Similarly, the radio functions required during a second mission segment for the aircraft are determined (step 504).

At step 506, a set of resource assets are configured to realize the first mission segment radio functions when the aircraft is operating in the first mission segment. As noted above, the configuration may include generating RF control signals and switching control signals to create radio function threads. Subsequently, when the aircraft is operating in a second mission segment, the resource assets are reconfigured to realize the second mission segment radio functions (step 508). This process is repeated for each new mission segment which has different functional thread requirements.

Figure 6:
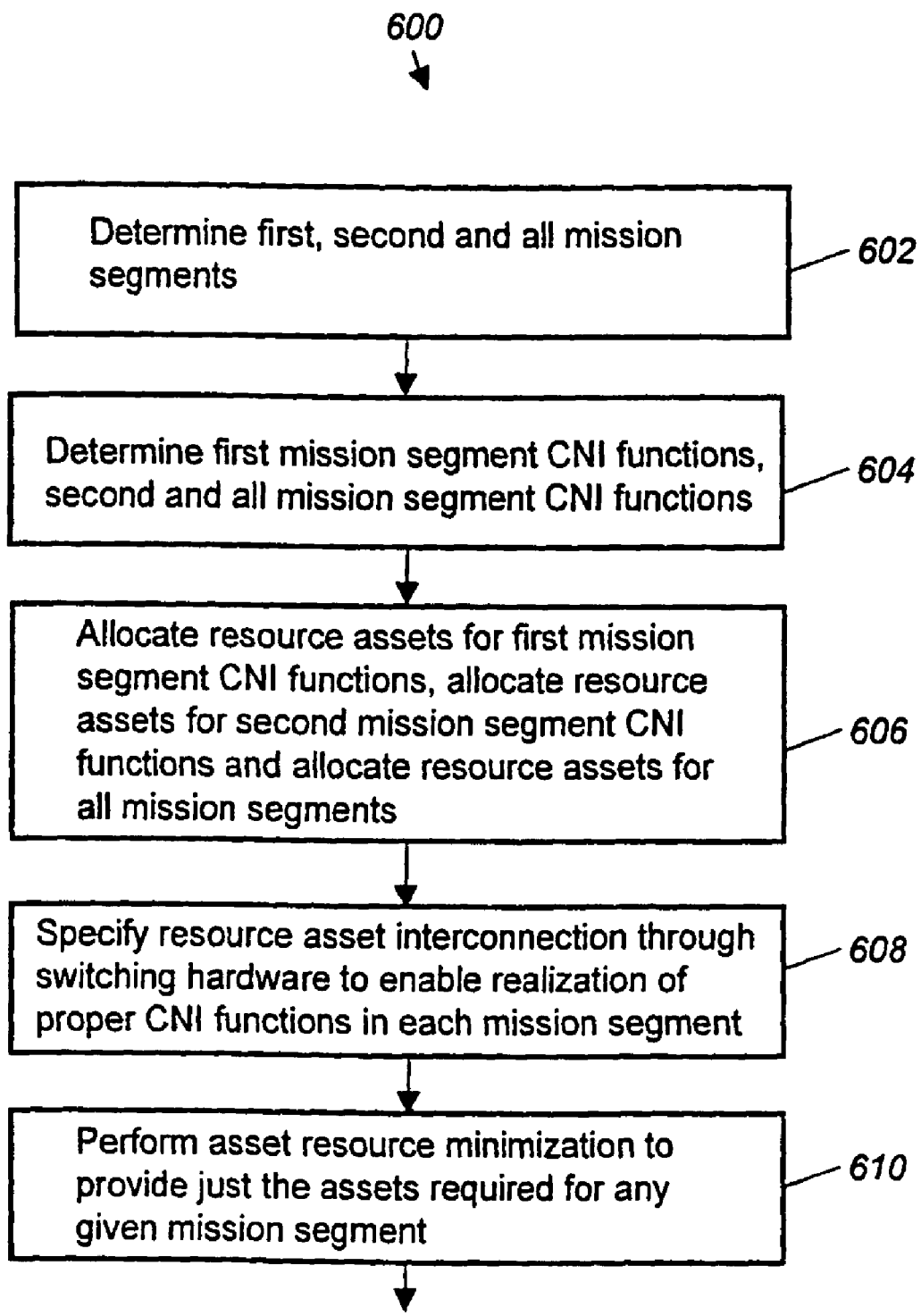
FIG. 6 shows a method for designing an electronic radio system.

With reference to FIG. 6, that figure shows a flowchart 600 of a method for designing an electronic radio system. At step 602, a first, second and all mission segments are defined. Next, at step 604, the radio functions required in each of the mission steps are determined.

An asset resource allocation is performed to determine which asset resources are needed for the first mission segment radio functions and which asset resources are needed for the second and all subsequent mission segment radio functions (step 606). Next, the interconnection of resource assets through switching hardware is specified (step 608). The resource assets are connected such that all of the first mission segment radio functions are realizable during the first mission segment and all of the mission segment radio functions are realizable during the second and all subsequent mission segments.

At the resource asset minimization step 610, a minimal set of resource assets is determined (using e.g., a minimization algorithm), such that all of the radio functions associated with any one of the mission segments are simultaneously realizable using the minimal set of resource assets. Then, as additional mission segments occur, the processor 428 reprograms the radio function threads to implement the radio functions required in each additional mission segment. Because the number of resource assets has been minimized, the electronic radio system includes no unnecessary duplication of resource assets.

Figure 7:
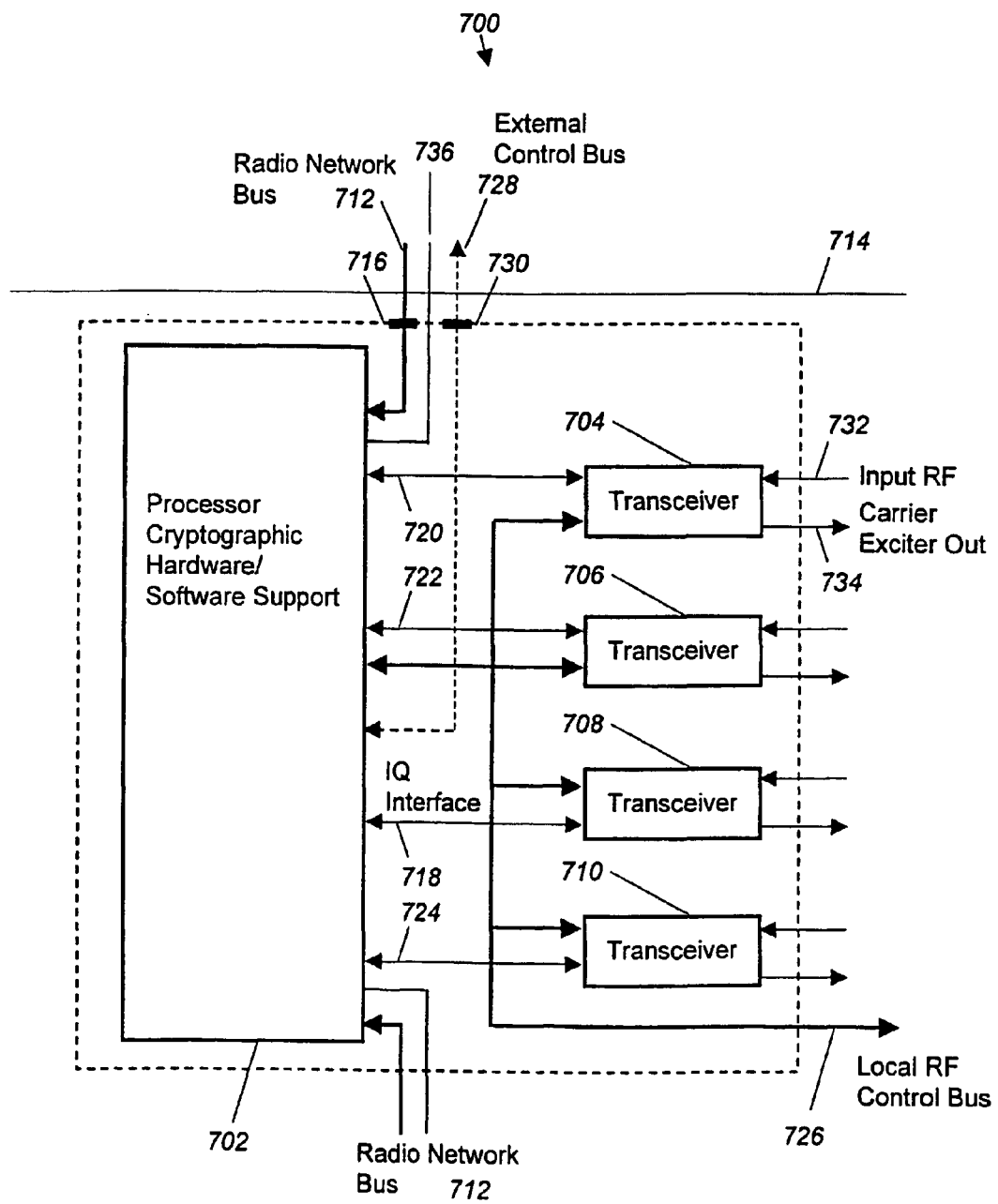
FIG. 7 illustrates a transceiver-processor building block for an electronic radio system.

Turning now to FIG. 7, that figure shows a transceiver-processor building block 700. The building block 700 includes a processor 702 coupled to multiple transceivers 704, 706, 708, 710. A radio network bus 712 connects to the processor 702 from outside the multifunction slice boundary 714 through the network bus connector 716. The building block 700 may be a physical hardware unit that may be inserted into a multifunction slice, for example. More generally, however, the building block 700 represents a design unit that an electronic radio system designer may, for example, retrieve from a CAD library when designing a new electronic radio system.

Generic inphase and Quadrature (IQ) bi-directional communications data interfaces 718, 720, 722, and 724 connect the processor 702 to the transceivers 704-710. The IQ interfaces 718-724, however, may be replaced with other new specific data interfaces, such as serial digital or analog magnitude, suitable for the particular modulation technique that the processor 702 employs. The building block 700 includes a local RF control bus 726 that also connects the processor 702 to the transceivers 704-710. Additionally, an external control bus 728 connects to the processor 702 and is accessible from outside the multifunction slice boundary 714 through the external control bus connector 730. Each transceiver 704-710 includes a RF input (e.g., the RF input 732) and a carrier output (e.g., the low level RF carrier (exciter) output 734) that connect to, for example, an antenna interface unit which contains the multifunction RF transmitter.

The processor 702 preferably includes cryptographic support for each transceiver 704-710 in the transmit and receive directions. In one embodiment, the processor 702 executes cryptographic support software from program memory to accomplish encryption and decryption. In an alternate embodiment, dedicated cryptographic circuits are embedded within the processor 702 to handle encryption and decryption. The embodiment is determined by the low latency requirements for the cryptographic support. The type of encryption applied is driven by the particular application in which the building block is used, and may include, for example, support for the following encryption standards: KGV-8, KGV-10, KGV-11, KGV-23, KG-84A, KGR-96, KY-58, and Havequick Applique.

The processor 702 performs high-rate data bit signal processing functions, message rate processing and control processing for the multifunction slice in which it resides. The high-rate data bit, message rate, and control functions include preprocessing, signal processing, data processing, RF and external control and cryptographic processing for simultaneously implementing multiple radio functions. Thus, a single transceiver-processor building block 702 localizes the processing that, in the past, was distributed among numerous separate modules. Such localization may be implemented using high speed analog to digital converters, high clock speed high throughput processors, high density Field Programmable Gate Arrays, high density memories, integrated cryptographic processors, and common off the shelf bus devices.

The processor 702 communicates outside of its multifunction slice over the radio network bus 712. To this end, the radio network bus 712 may be implemented as a common off the shelf bus, such as an IEEE-1394 bus. Because the radio network bus 712 travels between multifunction slices, the radio network bus is used for inter-slice communication, command, and coordination.

In particular, the radio network bus 712 carries in most instances unencrypted information. The unencrypted information may include, as examples, voice data, transmission coordination data, and relay data. Voice data includes voice communications recovered from, or for transmission through, the transceivers 704-710 and sent to audio control panel external to the slice. The transmission coordination data includes information concerning the ongoing operation of other multifunction slices so that the processor 702 is aware of the availability or in-use communications frequencies, shared RF assets, and coordination of communication threads. Relay data includes information sent by another multifunction slice to the processor 702 for retransmission or reprocessing.

The radio network bus 712, which contains sensitive data traffic, is preferably isolated from the local RF control bus 726, and the external control bus 728, using, for example, electromagnetic shielding 736. Isolating the radio network bus 712 in this manner helps to prevent unencrypted or generally sensitive information from radiating through the transceivers 704-710 or antennas directly into space.

The transceivers 704-710 are preferably independently tunable over a wide range of frequencies and provide control over intermediate frequency, bandwidth, and gain characterization, digitization of incoming RF signals, analog conversion of outgoing RF signals, and filtering of the incoming and outgoing RF signals before or after digitization. In order to control the transceivers, the local RF control bus 726 carries control information from the processor 702. To this end, the processor 702 may provide, for example, intermediate frequency bandwidth, receiver/exciter local oscillator tuning, and intermediate frequency gain characteristic configuration information for each transceiver 704-710 as determined by the predetermined need for communication threads.

The local RF control bus 726 is for local RF control and as such is isolated inside the multifunction slice. In other words, the local RF control bus 726 is not directly accessible from outside the multifunction slice that incorporates the building block 714. Control information on the local RE control bus 726 is generated by the processor 702 to control RF assets within the multifunction slice. Coordinated control over several multifunction slices is conducted on the radio network bus 712. The external control bus 728 is used by the processor 702 to control assets that are external to the slice (i.e., antenna preconditioners).

With regard to the external control bus 728, however, the external control bus 728 may leave the multifunction slice and connect to other systems. As examples, the external control bus 728 may carry antenna and interferometer configuration information. Such information may be used to position an antenna beam for spatially directed communications, for example.

Figure 8:
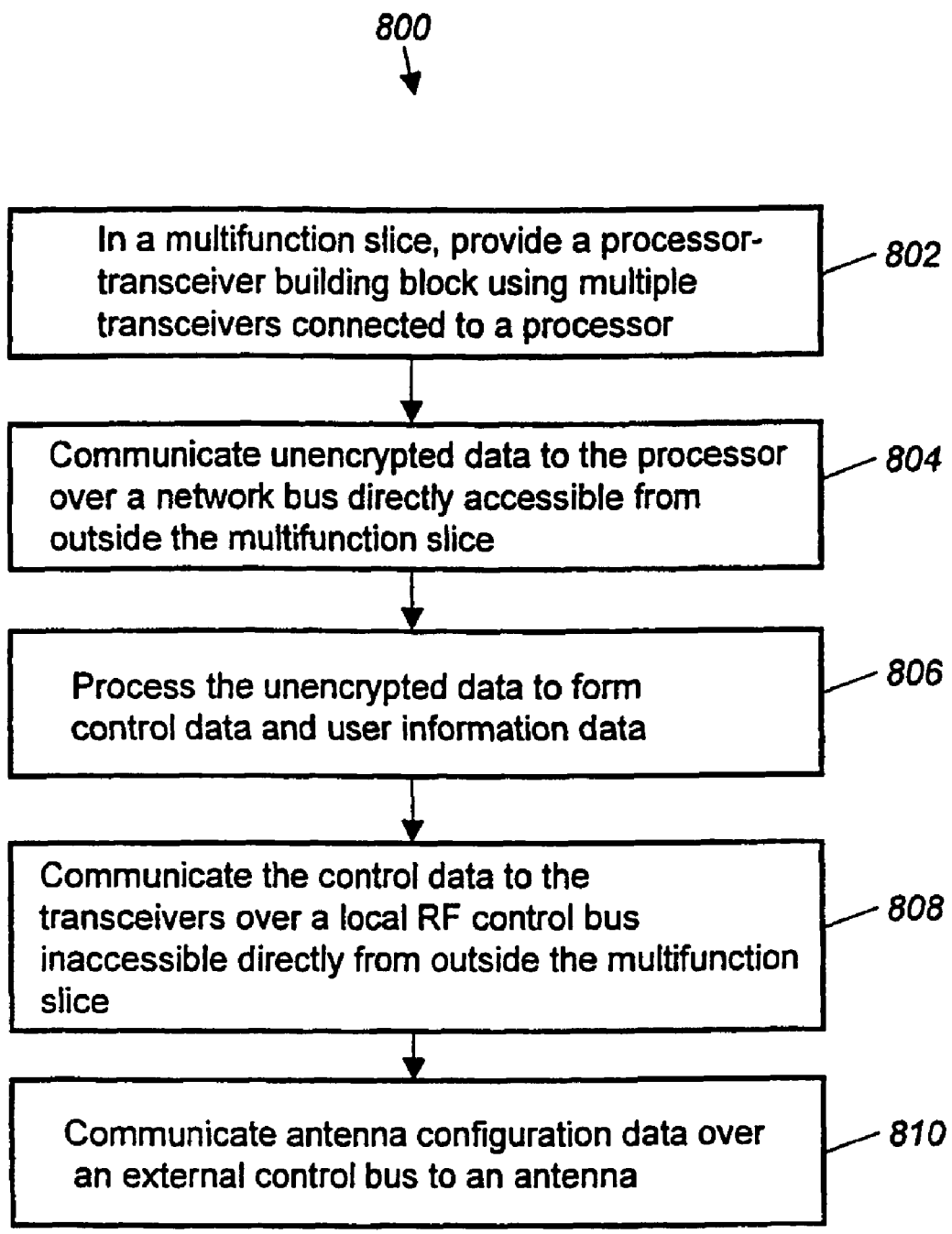
FIG. 8 shows a method for operating a transceiver-processor building block.

Turning next to FIG. 8, that figure shows a flow diagram 800 for operating a transceiver-processor building block. At step 802, a multifunction slice is provided that includes a transceiver-processor building block as described above (i.e., including several transceivers coupled to a processor). Next, the method communicates preferably unencrypted data over a radio network bus to the processor (step 804). As noted above, the radio network bus is accessible directly from outside the multifunction slice.

Continuing at step 806, the processor processes the data received over the radio network bus to form control data. The processor then communicates the control data to the transceivers over the local RF control bus (step 808). As noted above, the local RF control bus is inaccessible directly from outside the multifunction slice. Furthermore, as noted above, an external control bus may communicate antenna control data directly to an antenna outside the multifunction slice (step 810).

Thus, the transceiver-processor building block 700 provides the heart of totally self-contained multiple channel radio capability that may be programmed using the radio network bus 712 and local RF control bus 726 to perform transceiver, digital processing, and cryptographic functions for a wide range of electronic radio functions. Thus, the complex and costly federated (i.e., custom) design approach to prior radio systems is avoided. In other words, the transceiver-building block 700 provides a single design unit that eliminates the need for multiple receiver, transmitter, preprocessor, signal processors, data processors, and cryptographic processors used in the past.

Note also that including cryptographic processing within the processor 702 allows the building block 700 to provide complete Red/Black separation between the radio network bus 712 and the local RF control bus 726. In other words data received over the radio network bus 712 need not be propagated elsewhere before transmission, particularly not near areas of the electronic radio system that may cause the radio network bus data to be radiated into space. Furthermore, independent slices with the independent IQ interfaces 718-724 and local RF control bus 726 greatly decreases interdependencies among radio functions, reduces the impact to the complete electronic radio system when a new radio function is added, limits radio system impacts that might otherwise be caused by an internal transceiver-processor building block failure propagating effects to other parts of the radio system, and simplifies integration and test during the development cycle.

While the invention has been described with reference to a preferred embodiment, it will be understood by those skilled in the art that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A multifunction slice building block comprising:
an antenna interface;
n bi directional wideband transceivers, where n is a positive integer greater than 1, each of the n bi directional wideband transceivers being coupled to the antenna interface, the n bi directional wideband transceivers being capable of supporting one or more radio functions from a set of radio functions;
m programmable processors, where m is a positive integer greater than or equal to 1, each of the m programmable processors being coupled to all the n bi directional wideband transceivers to control operation of, and to process data transmitted and data received through, each of the n bi directional wideband transceivers, and operable to simultaneously support one or more radio function threads corresponding to the one or more radio functions from the set of radio functions through the n bi directional wideband transceivers; and
a user data interface for providing control, status, and input/output data between the m programmable processors and a user, wherein
the multifunction slice building block is combinable with other multifunction slice building blocks to form a programmable electronic radio system that is capable of performing all the radio functions in the set of radio functions, the programmable electronic radio system includes a master processor for controlling the multifunction slice building and the other multifunction slice building blocks to implement all the radio functions in the set of radio functions through the one or more functions threads in each of the multifunction slice building block and the other multifunction slice building blocks, and one of the m programmable processors from the multifunction slice building block and the other multifunction slice building blocks in the programmable electronic radio system can be designated as the master processor or as a replacement master processor if the master processor fails.

2. The multifunction slice building block of claim 1, wherein
each of the m programmable processors is operable to perform digital signal processing functions selected from the group consisting of modulation, demodulation, encoding/decoding, detection, encryption and decryption.

3. The multifunction slice building block of claim 1, wherein
the set of radio functions includes communication, navigation, interrogation, and surveillance functions.

4. The multifunction slice building block of claim 1, wherein
the set of radio functions includes voice radio communication, data network communication, electronic navigation aids, radio beacon detection, global and local grid positioning system detection, and friend-or-foe identification challenging and responding.

5. The multifunction slice building block of claim 1, wherein
the antenna interface is coupled to a plurality of external antenna preconditioning units.

6. The multifunction slice building block of claim 1, wherein
the antenna interface using a radio frequency control bus for sending control and switching signals.

7. The multifunction slice building block of claim 1, wherein
the m programmable processors are for providing red and black data separation and encryption/decryption functions so that data input to and output from the user data interface is unencrypted.

8. A programmable electronic radio system capable of being programmed and re-programmed to perform a set of radio functions, comprising:
a multifunction slice building block including the following components:
an antenna interface,
n bi directional wideband transceivers, where n is a positive integer greater than 1, each of the n bi directional wideband transceivers being coupled to the antenna interface, the n bi directional wideband transceivers being capable of supporting one or more radio functions from the set of radio functions,
m programmable processors, where m is a positive integer greater than or equal to 1, each of the m programmable processors being coupled to all the n bi directional wideband transceivers to control operation of, and to process data transmitted and data received through, each of the n bi directional wideband transceivers, and operable to simultaneously support one or more radio function threads corresponding to the one or more radio functions from the set of radio functions through the n bi directional wideband transceivers, and
a user data interface for providing control, status and input/output data between the m programmable processors and a user;
at least one antenna pre-conditioner connected to the antenna interface of the slice building block;
at least one antenna that is coupled to the at least one antenna pre-conditioner;
a general input/output structure that delivers information to and receives information from the multifunction electronic radio system through the user data interface; a master processor for controlling the multifunction slice building block to program and reprogram assignment of the one or more radio function threads by commanding the multifunction slice building block to configure signal interconnections between components included therein, the at least one antenna pre-conditioner, the at least one antenna, and the general input/output structure by using only required ones of the components included in the multifunction slice building block, the at least one antenna pre-conditioner, the at least one antenna, and the general input/output structure to implement the one or more function threads as complete function threads; and
at least one additional multifunction slice building block, wherein a processor from either the multifunction slice building block or from one of the at least one additional multifunction slice building block can be designated as the master processor or as a replacement master processor if the master processor fails and the one or more radio function threads are programmed and reprogrammed so as to perform all the radio functions in the set of radio functions.

9. The programmable electronic radio system of claim 8, wherein
the master processor comprises one of the m programmable processors in the multifunction slice building block.

10. The programmable electronic radio system of claim 8, wherein
the m programmable processors are for providing red and black data separation and encryption/decryption functions so that data input to and output from the user data interface is unencrypted.

11. The programmable electronic radio system of claim 8, wherein
the m programmable processors generate radio frequency control signals, switching control signals and processing functions to simultaneously implement the one or more radio function threads as needed.

12. An electronic radio system, capable of being programmed and re-programmed to simultaneously perform one or more radio functions from a set of radio functions, the electronic radio system having an architecture defined by a plurality of resource assets, comprising:
at least one multifunction slice including
an antenna interface,
at least one bi directional wideband transceiver coupled to the antenna interface,
at least one processor coupled to the at least one bi directional wideband transceiver, and controlling operation of, and processing data transmitted and data received through, the at least one bi directional wideband transceiver, and
a user data interface;
an antenna pre-conditioner connected to the antenna interface of the at least one multifunction slice;
at least one antenna that is coupled to the antenna pre-conditioner;
a user input/output bus structure that delivers information to and receives information from the electronic radio system through the user data interface; and
a master processor for providing control over the at least one multifunction slice to program and re-program assignment of the one or more function threads through the plurality of resource assets by instructing the at least one multifunction slice to configure signal interconnections between the plurality of resource assets by using only required ones of the plurality of resource assets to implement the one or more function threads as complete function threads, wherein
the or more radio function threads are programmed and reprogrammed so as to perform all the radio functions in the set of radio functions, the master processor comprises the at least one processor included in the at least one multifunction slice that is coupled to the at least one bi directional wideband transceiver, and the electronic radio system further comprises a second multifunction slice, in addition to the at least one multifunction slice, that includes a second at least one processor which can be designated as a replacement master processor if the master processor fails.

13. The electronic radio system of claim 12, wherein
the at least one bi directional wideband transceiver is coupled to the antenna interface, and
the at least one processor comprises a plurality of processors coupled to the at least one bi directional wideband transceiver to control operation of, and to process data transmitted and data received through, the at least one bi directional wideband transceiver.

14. The electronic radio system of claim 12, wherein
the master processor is operative to cause a failed one of the plurality of resource assets to be circumvented and to cause an alternate radio thread to be implemented that circumvents the failed one of the plurality of resource assets.

15. The electronic radio system of claim 12, wherein
the master processor causes prioritization of the plurality of resource assets based on criticality of each of the plurality of resource assets to a particular radio function.

16. The electronic radio system of claim 12, wherein
the master processor causes signal interconnections between the plurality of resource assets by using only required ones of the plurality of resource assets to implement the one or more function threads as complete function threads based on a radio function selection signal received through the data interface.

* * * * *